United States Patent Office 3,558,323
Patented Jan. 26, 1971

3,558,323
VITAMIN-CONTAINING COMPOSITION IN BEADLET FORM
Marco Alfred Cannalonga, Fort Lee, and Norman Cohen, West Paterson, N.J., assignors to Hoffmann-La Roche Inc., Nutley, N.J., a corporation of New Jersey
No Drawing. Continuation-in-part of application Ser. No. 613,403, Feb. 2, 1967. This application June 12, 1969, Ser. No. 832,828
Int. Cl. A23l 1/30
U.S. Cl. 99—11                      11 Claims

ABSTRACT OF THE DISCLOSURE

A vitamin-containing composition in beadlet form comprising (a) a modified gelatin product, (b) edible, saturated oil, (c) fat soluble vitamin-containing material, and (d) alpha-tocopherol.

RELATED APPLICATIONS

The application is a continuation-in-part of U.S. patent application Ser. No. 613,403, filed Feb. 2, 1967, now abandoned.

SUMMARY OF THE INVENTION

This invention relates in general to vitamin containing compositions. More particularly, the invention relates to stable readily dispersible fat soluble vitamin containing compositions in dry free-flowing form and to the use of such compositions in the fortification of fluid whole or skim milk and spray dried skim milk.

BACKGROUND OF THE INVENTION

In the past, it has been an almost uniform practice in the dairy industry to use liquid vitamin containing compositions in the fortification of fluid whole or skim milk. At the present time, however, there appears to be preference in the industry toward the use of vitamin containing products in the form of powders or beadlets. There are presently available commercially a large variety of dry free-flowing vitamin containing compositions. For the most part, however, the products which are now available are not satisfactorily useful in the fortification of fluid milks since they do not have one or more of the properties required for a milk supplement. For example, one attribute which must be possessed by a product used in fortifying fluid whole or skim milk is an ability to be dispersed readily and completely in cold as well as warm milk. In many instances, the dry vitamin products which are now available do not possess the requisite dispersibility characteristics. Moreover, to be satisfactory for use, the vitamin containing composition must be such that it does not impart an unfavorable flavor to the fluid milk, either when initially added to the milk or upon refrigerated storage of the fortified fluid milk during distribution to and consumption by the user.

A great many of the dry vitamin containing compositions which are now available commercially including some which possess satisfactory properties have been found to impart to the whole or skim milk to which it is added a decided and wholly undesirable off-flavor. This is particularly true after the fortified milk has been stored under refrigeration for some time. Finally, the product itself must have a reasonably long shelf life, that is, the vitamins in the supplements must be stable and the supplement must not develop an off-flavor during storage.

DETAILED DESCRIPTION OF THE INVENTION

In its broadest embodiment, the present invention is concerned with stable compositions containing fat soluble vitamins, in dry free-flowing form and with the production of such products.

In a more limited embodiment, the present invention is concerned with compositions containing fat soluble vitamins, in dry free-flowing form which possess properties which render them uniquely well suited for use in the fortification of fluid whole or skim milk and spray dried skim milk. In a more particular embodiment, the invention provides beadlets which contain fat soluble vitamins in stable form, such beadlets being characterized especially by their stability and ready and complete dispersibility in fluid whole or skim milk and by the fact that when dispersed in the fluid milk, they impart no off-flavor thereto either immediately after dispersion therein or after the milk has been stored under refrigeration. Furthermore, the dry free-flowing vitamin compositions are characterized by their ability to mix with spray dried skim milk without adversely affecting the taste or stability of the milk powder.

The compositions of this invention contain as the essential ingredients thereof (1) from about 47% to about 92% by weight of the reaction product between (a) gelatin, (b) ascorbic acid or a mixture of ascorbic acid and citric acid, or a mixture of citric acid with sorbose, (c) sorbitol and (d) water, the nature and production of which will be described hereinafter; (2) from 5% to about 15% by weight of an edible highly saturated organic oil, e.g., modified coconut oil or coconut oil; (3) from about 5% to about 50% by weight of a fat soluble vitamin; (4) and from about 0.1% to about 3% by weight of α-tocopherol. As optional ingredients, the compositions may contain antioxidants, plasticizers, buffering agents, coloring agents, etc.

The modified gelatin products which are used in the practice of this invention are prepared by forming a mixture of gelatin with either ascorbic acid, a mixture of ascorbic acid and citric acid or a mixture of citric acid and sorbose and heating such mixture in the presence of sorbitol. As used herein, the term "ascorbic acid" includes also isoascorbic acid, e.g., d-isoascorbic acid.

More specifically, the modified gelatin products which are employed in the production of the vitamin containing compositions of this invention are prepared by heating a mixture comprising (a) from about 20% to about 50% by weight of gelatin; (b) from about 5% to about 35% of ascorbic acid or a mixture of ascorbic acid with citric acid or a mixture of citric acid with sorbose; (c) from about 10% to about 40% of sorbitol; and (d) from about 10% to about 50% of water. The quantity of water which is present in the system should be sufficient to maintain the reaction mixture in a free-flowing liquid form. A preferred modified gelatin product is prepared by heating a mixture comprising (a) from about 32% to about 36% by weight of gelatin; (b) from about 8% to about 12% by weight of ascorbic acid; (c) from about 12% to about 25% by weight of sorbitol; and (d) from about 35% to about 45% by weight of water. In a preferred preparative method, the modified gelatin product is obtained as follows: An aqueous solution of sorbitol is first prepared. This is accomplished by mixing sorbitol in water generally at an elevated temperature, for example, the aqueous sorbitol solution can be prepared conveniently at a temperature within the range of from about 70° C. to about 90° C. In a subsequent step, ascorbic acid or in the alternative the mixture of ascorbic acid and citric acid or the mixture of citric acid and sorbose is added to and dissolved in the heated sorbitol solution. Thereafter, gelatin is added to the aqueous solution containing sorbitol and ascorbic acid and the mixture which is thus obtained is stirred at an elevated temperature. The temperature at which the reaction mixture is heated is not particularly critical. While the reaction is carried out, preferably at a temperature of from about 75° C. to 85° C., it can be effected by stirring the reaction mixture at any temperature above about 40° C. to the decomposition temperature of the ingredients. However, the use of lower temperatures, that is, temperatures within the range of from about 40° C. to 60° C., are impractical from a commercial standpoint since they serve primarily to extend the reaction time. Thus, for example, when the reaction mixture is heated at a temperature of from about 75° C. to 85° C., the reaction is complete in a period of from about 4 to 6 hours. Where lower temperatures are used, correspondingly longer heating periods even up to a week or more are required. In preparing the modified gelatin product, the preparation of which is described in the preceding paragraphs, there is employed a gelatin which has a bloom within the range of from about 30 to 100, preferably from about 40 to about 60, a molecular weight of from about 25,000 to about 60,000 and a viscosity of about 16 to 25 millipoises. Furthermore, the gelatin employed as a starting material hydrates in cold water. Either type A gelatin or type B gelatin can be used, although type B is used in preparing the modified gelatin products employed in producing the preferred products of the invention.

Ascorbic acid is preferably used in the preparation of the modified gelatin products. However, as indicated heretofore, either a mixture of ascorbic acid and citric acid or a mixture of citric acid and sorbose can be employed in lieu of ascorbic acid. Where a mixture of ascorbic acid and citric acid is employed, such mixture should contain at least about 20° by weight of ascorbic acid. Where a citric acid-sorbose mixture is used, such mixture should contain at least about 40% by weight of citric acid and at lease 20% by weight of sorbose.

The highly saturated organic oils suitable for use in this invention can be either naturally occurring or modified materials. They must be edible, essentially tasteless, a pharmaceutically acceptable grade and contain sufficient unsaturation to possess high stability towards oxidation. Highly saturated triglycerides are among the suitable materials.

Generally, the oils contain less than about 6% unsaturated carboxylic acids containing eight or more carbon atoms, and at least about 94% saturated carboxylic acids containing eight or more carbon atoms. A typical oil is coconut oil which contains about 51% lauric acid, about 18.5% myristic acid, about 9.5% caprylic acid, about 7.5% palmitic acid, about 4.5% capric acid, about 3% stearic acid and about 6% oleic and linoleic acids.

Other saturated oil, e.g., modified coconut oil such as Neobee M-5 (Drew Chemical Corp., New York, N.Y.) which is a saturated, fractionated, triglyceride of coconut oil origin, are suitable provided they are compatible with the compositions of this invention, edible, essentially tasteless, pharmaceutically acceptable and possess stability to oxidation. The oils impart to the compositions flavor stability which does not vary upon storage. Generally, the oil is mixed together with Vitamin A palmitate prior to incorporation into the basic formulation.

The reacted gelatin product is no longer a true gelatin material but can be characterized as a polypeptide type material. The products have essentially a zero bloom, however, they can have some slight gel properties, e.g., up to about 25 bloom. The reaction product has a molecular weight of from about 1,200 to about 2,500, a viscosity of about 5 to 10 millipoises and it dissolves readily and rapidly in cold water without hydration. Chemically, the product contains the reactants combined in an undetermined manner in the same proportions as used in its preparation. For convenience, the gelatin reaction product is referred to as a modified gelatin product.

In producing the vitamin containing compositions of this invention, a solution containing the modified gelatin product is ordinarily maintained at a pH within the range of 3.5 to 7, preferably the solution is maintained at a pH of from about 3.8 to about 5.5. This is accomplished generally by means of use of a suitable buffering agent. Sodium citrate is a buffer preferably employed for this purpose, although other conventional buffers may be used. If desired, buffer is added to the aqueous solution containing the modified gelatin product prior to the use of such product in the preparation of the dispersible vitamin product. The quantity of buffer which is used, of course, is variable, preferably, however, the buffering agent is used in such quantity as to provide the final product, that is, dispersible vitamin compositions, in dry free-flowing form with from about 3% to about 9% by weight of the buffer.

The solution containing the modified gelatin product which is described in the preceding paragraph is used in producing the dry vitamin-containing products of this invention. In a preferred preparative method, the aqueous solution containing the modified gelatin product is charged into a suitable vessel. In a separate vessel, an oil phase is prepared by mixing together the fat soluble vitamin material, α-tocopherol, and the highly saturated oil, and, optionally, an antioxidant. Subsequently, the oil phase is added to, and emulsified in, the aqueous solution which contains the modified gelatin product. A sufficient quantity of the mixture comprising the oil phase is used to provide a product which, in dry, free-flowing form, contains from about 5% to about 50% by weight of the fat soluble vitamin. Moreover, a sufficient quantity of the mixture comprising the oil phase is used to provide a product which, in dry, free-flowing form, contains from about 0.1% to about 3% by weight of α-tocopherol and from about 5% to about 15% of the highly saturated oil. The mixture comprising the oil phase is emulsified in a quantity of the aqueous modified gelatin product which is sufficient to provide a product which, in its dry, free-flowing form, contains from about 47% to about 92% by weight of such modified gelatin product.

In the preferred practice of the invention, sufficient quantities of the various ingredients are used to provide a product containing from about 60% to about 70% by weight of the modified gelatin product; from about 8% to about 15% by weight of the fat soluble vitamin-containing material, from about 0.2% to about 1% by weight of α-tocopherol; from about 5% to about 15% of the highly saturated oil; from about 5% to about 8% by weight of sodium citrate; from about 10% to about 20% by weight of a plasticizer and from about 0.25% to about 3.0% by weight of an antioxidant.

In general, there can be used in the practice of this invention any fat soluble vitamin-containing material together with the highly saturated oils. Thus, for example, the present invention can be utilized as the means for obtaining dry, free-flowing products containing vitamin A, D, E or K or mixtures thereof. Preferably, however, the invention is used in the production of products containing either vitamin A, for example, vitamin A palmitate or vitamin A acetate, or vitamin D, or mixtures of the vitamin A compound and vitamin D.

As indicated heretofore, antioxidants, plasticizers, coloring agents, etc. can be incorporated into the emulsion from which the products of this invention are prepared. As the plasticizer, there can be used sorbitol or corn syrup or any other conventional plasticizing agent. The emulsions which are used in producing the preferred compositions of the invention contain corn syrup as the plasticizer. The plasticizer may comprise up to about 25% by weight of the final product in its dry free-flowing form. However, as stated previously, the preferred products of this invention contain from about 10% to about 20% by weight of the plasticizer.

As the antioxidant, there can be used any antioxidant which is commonly employed in producing the dry, vitamin-containing compositions of the art. They include, for example, butylated hydroxy anisole, butylated hydroxy toluene, etc. Generally, the antioxidant, or a mixture of antioxidants, will comprise up to about 3% by weight of the final product in its dry, free-flowing form. The preferred products of this invention contain at least about 0.5% by weight of an antioxidant material.

The emulsion, described in the preceding paragraphs, is, in a subsequent step of the preparative method, converted by appropriate means, into liquid droplets. Such liquid droplets are kept physically separated until their solid particulate form is permanently established. In general, the emulsions can be converted into liquid droplets by any conventional means. Conveniently, this can be accomplished by projecting the heated emulsion, from a moving or fixed nozzle, through an atmosphere of cool air or into a collection bed comprising a cool liquid, such as, vegetable oil, or into a collection bed comprising a starchy powder, in which atmosphere or collection bed, the permanent solid particulate form of the product is established. Exemplary of a method which is completely suitable for use is the procedure described in U.S. Pat. No. 2,756,177.

The precise method or device which is utilized to convert the emulsion into liquid droplets and to introduce the droplets into a cooled, inert atmosphere or into a suitable collection bed is not critical to the operability of the invention. It is essential, however, that the droplets be kept physically separate until their particulate form is permanently established. Where the vitamin-containing particles have been collected in a starchy powder such as described in U.S. Pat. No. 2,756,177, separation of the vitamin products can be effected, for example, by screening. Where, however, a liquid collection bed is utilized, separation of the vitamin product from such liquid can be accomplished by filtration, centrifuging or some other means and the washing and drying of the particles can be effected by conventional methods.

As stated heretofore, the products of this invention have been found to be well suited for use in the fortification of fluid whole or skim milk and spray dried skim milk. They are stable and they have no undesirable taste. They are readily dispersible in the fluid milks to provide a stable and biologically available source of fat-soluble vitamins and are compatible with the spray dried skim milk. Moreover, the present products do not, initially, impart to the fluid whole of skim milk or spray dried skim milk any undesirable off-flavor and maintain the flavor of the fluid milks upon refrigerated storage and the spray dried skim milk upon bulk storage. The reason why the present products are so well suited for use in the fortification of milk has not been established. It has been determined, however, that the nature of the modified gelatin product present in the products, as well as the presence of α-tocopherol and the highly saturated edible oils therein is extremely critical. The presence of sorbitol during the preparation of the modified gelatin product, i.e., during the step of cooking gelatin with ascorbic acid, or with a mixture of ascorbic acid and citric acid, or with the mixture of citric acid and sorbose, is essential to the suitability of the modified gelatin products employed. Dry vitamin products, obtained using a gelatin modified by reaction with ascorbic acid prepared in the absence of sorbitol are not satisfactory in the fortification of fluid whole or skim milk or spray dried skim milk. Moreover, dry vitamin products produced as described herein, but which do not contain α-tocopherol and highly saturated edible oils are similarly unsatisfactory from a taste standpoint for use in the fortification of milk.

The manner in which the vitamin-containing compositions of this invention are used will be immediately apparent to the art. The products, in beadlet form can be added as is, to fluid whole or skim milk and dispersed therein by stirring. In the alternative, the products can be dispersed, first, in some liquid vehicle in concentrated form and the liquid concentrate added to the fluid milk. In the case of spray dried skim milk, the vitamin containing composition, in beadlet or powder form can be united with the skim milk by tumbling, then the mixture can be dispersed in a suitable liquid, e.g., water. The quantity of vitamin-containing product which is added, in any given instance, to the milk is variable, depending, for example, on the vitamin potency of the product and the vitamin potency sought to be achieved in the fluid whole or skim milk.

Preferably, sufficient vitamin containing product is added to milk to result in at least about 1,000–4,000 International Units of vitamin A per quart and/or at least about 100–400 International Units of vitamin D per quart.

For a fuller understanding of the nature and objects of this invention, reference may be had to the following examples which are given merely as further illustrations of the invention and are not to be construed in a limiting sense.

Example 1

In this example, 10.38 kg. of a 70% aqueous sorbitol solution was added to 15.3 kg. of water. The mixture was heated slowly to a temperature of about 80° C. Thereafter, 4.875 kg. of ascorbic acid was added to, and dissolved in, the aqueous sorbitol solution at a temperature of about 80° C. Subsequently, 15.3 kg. of gelatin was added to the sorbitol-ascorbic acid solution and the mixture which was thus obtained was stirred and heated at a temperature of about 80° C. for a period of about 6 hours. At the end of the 6 hour period, the aqueous reaction mixture was cooled to room temperature.

In the next step of the process, 15.3 kg. of the aqueous reaction mixture, produced as described in the preceding paragraph was charged into a suitable vessel, following which 1.562 kg. of sodium citrate was added thereto. In a separate vessel, a mixture of 0.302 kg. of butylated hydroxy toluene, 0.09 kg. of α-tocopherol, 2.941 kg. of vitamin A palmitate Type P 1.8 and 2.2 kg. coconut oil (Cobee 76, by Drew Chemical Corp.) was prepared. This mixture was added to the aqueous gelatin reaction product-containing phase and emulsified therein, using an Eppenbach emulsifier. During the emulsification, 1.5 kg. of corn syrup (80%) solids were added to the system.

The emulsion, produced as described in the preceding paragraph, was converted into beadlets by the procedure described in U.S. Pat. 2,756,177, granted July 24, 1956. This procedure involved forming the emulsion into droplets by passing the emulsion through a revolving spray head and introducing the emulsion droplets into an agitated cloud or suspension in air of a collecting powder. The apparatus employed in accomplishing this was the revolving spray head and rotating drum described in U.S. Pat. 2,756,177 and the collecting powder which was used was the free-flowing starch ester, resistant to water-wetting, available under the trade name "Dry-Flo" and distributed by National Starch Products, Inc., New York, N.Y.

The vitamin-containing beadlets, thus obtained, were separated from the Dry-Flo by screening, following which they were dried to a moisture content of 2%–5%.

Example 2

In this example, 10.38 kg. of a 70% aqueous sorbitol solution was added to 15.3 kg. of water. The mixture was heated slowly to a temperature of about 80° C. Thereafter, 4.875 kg. of ascorbic acid was added to, and dissolved in, the aqueous sorbitol solution at a temperature of about 80° C. Subsequently, 15.3 kg. of gelatin was added to the sorbitol-ascorbic acid solution and the mixture which was thus obtained was stirred and heated at a temperature of about 80° C. for a peroid of about 6 hours. At the end of the 6 hour period, the aqueous reaction mixture was cooled to room temperature.

In the next step of the process, 14.3 kg. of aqueous reaction mixture, produced as described in the preceding paragraph was charged into a suitable vessel, following which 1.562 kg. of sodium citrate was added thereto. In a separate vessel, a mixture of 0.302 kg. of butylated hydroxy toluene, 0.09 kg. of α-tocopherol, 2.941 kg. of vitamin A palmitate Type P 1.8 and 0.013 kg. of vitamin $D_2$ (calciferol, potency 40 M I.U. per gram) and 2.2 kg. coconut oil (Cobee 76, by Drew Chemical Corp.) was prepared. This mixture was added to the aqueous gelatin reaction product-containing phase and emulsified therein, using an Eppenbach emulsifier. During the emulsification, 1.5 kg. of corn syrup (80%) solids were added to the system.

The emulsion, produced as described in the preceding paragraph, was converted into beadlets by the procedure described in Example 1.

Example 3

In this example, a vitamin-containing product, in beadlet form, was prepared using the same ingredients and proportions thereof as in Example 1 except that in place of the coconut oil, 2.2 kg. of Neobee M–5, a modified edible, saturated fraction of coconut oil of pharmaceutical grade, was used. The preparative method employed was identical to the preparative method of Example 1.

Example 4

In this example, a vitamin-containing product, in beadlet form, was prepared using the same ingredients and proportions thereof as in Example 2 except that in place of the coconut oil, 2.2 kg. of Neobee M–5, a modified edible, saturated fraction of coconut oil of pharmaceutical grade, was used. The preparative method employed was identical to the preparative method of Example 2.

The beadlets which were produced as described herein provide stable sources of vitamin A and vitamin A with vitamin D. The products were found to have relatively long shelf lives and to be readily dispersible in fluid whole or skim milk and easily mixed with spray dried skim milk. When dispersed in fluid whole or skim milk, no undesirable flavor is imparted thereto. When the milks containing the products were stored under refrigeration for extended periods of time, the flavor thereof did not change. Spray dried skim milk containing the beadlets produced as described herein were stable on the shelf for extended periods and when made down into fluid milk after storage, no undesirable flavor was apparent. This stability was maintained on refrigerated storage of the fluid milk.

There was, thus, obtained stable, vitamin-containing beadlets. These beadlets were found to have a relatively long shelf life and to be readily dispersible in fluid whole or skim milk. When dispersed in fluid milks, they imparted no "off-flavor" thereto, and upon refrigerated storage of the fluid milks, no "off-flavor" developed. Mixture of the vitamin-containing beadlets and spray dried skim milk were found to have relatively long shelf lives and when made down into fluid skim milk, no "off-flavor" developed, even upon further storage under refrigeration.

We claim:

1. A dispersible composition, in beadlet form, comprising (a) from about 47% to about 92% by weight of a modified gelatin product produced by heating from 4 to 6 hours, at a temperature of from about 40° C. to the decomposition temperature of the ingredients, a mixture of gelatin having a bloom of from about 30 to 100, a molecular weight of from about 25,000 to about 60,000, a viscosity of about 16 to 25 millipoises and the ability to hydrate in cold water, with a member selected from the group consisting of ascorbic acid, isoascorbic acid, a mixture of ascorbic acid and citric acid, a mixture of isoascorbic acid and citric acid and a mixture of citric acid with sorbose; sorbitol; and water, said product having zero bloom, a molecular weight of about 1,200 to about 1,500, a viscosity of about 5 to 10 millipoises, and ready dispersibility in cold water without hydrating, (b) from about 5% to about 15% by weight of an edible, saturated oil, (c) from about 5% to about 50% by weight of a fat soluble vitamin-containing material, and (d) from about 0.1% to about 3% by weight of α-tocopherol.

2. The composition of claim 1 wherein the edible, saturated oil is coconut oil.

3. The composition of claim 1 wherein the edible, saturated oil is a saturated, fractionated, triglyceride of coconut oil origin.

4. The composition of claim 1 wherein the modified gelatin product is produced by heating, at a temperature of from about 40° C., to the decomposition temperature of the ingredients a mixture comprising (1) from about 20% to about 50% by weight of gelatin, (2) from about 5% to about 35% by weight of a member selected from the group consisting of ascorbic acid, isoascorbic acid, a mixture of ascorbic acid and citric acid, a mixture of isoascorbic acid and citric acid and a mixture of citric acid and sorbose, said ascorbic acid-citric acid mixture containing at least about 20% by weight of ascorbic acid, said isoascorbic acid-citric acid mixture containing at least about 20% by weight of isoascorbic acid and said citric acid-sorbose mixture containing at least about 40% by weight of citric acid and at least about 20% by weight of sorbose, (3) from about 10% to about 40% by weight of sorbitol, and (4) from about 10% to about 50% by weight of water.

5. The composition of claim 1 wherein the fat-soluble vitamin ingredient is vitamin A palmitate.

6. The composition of claim 1 wherein the fat-soluble vitamin ingredient is vitamin A acetate.

7. The composition of claim 1 wherein the fat-soluble vitamin ingredient is a mixture of vitamin A and vitamin D.

8. The composition of claim 1 which contains, additionally from about 5% to about 8% by weight of sodium citrate, from about 5% to about 15% by weight of modified corn starch and from about 0.25% to about 3.0% by weight of butylated hydroxy toluene.

9. Spray dried skim milk containing the composition of claim 1.

10. Fluid whole milk containing dispersed therein, the composition of claim 1.

11. Fluid skim milk containing, dispersed therein, the composition of claim 1.

References Cited

UNITED STATES PATENTS

| | | | |
|---|---|---|---|
| 3,097,947 | 7/1963 | Kemmerer | 99—63 |
| 3,124,510 | 3/1964 | Rosenberg | 99—11X |
| 3,143,475 | 8/1964 | Koff et al. | 99—11X |
| 3,243,347 | 3/1966 | Krocauer | 99—56X |
| 3,351,531 | 11/1967 | Noznick et al. | 99—11X |

FOREIGN PATENTS

| | | | |
|---|---|---|---|
| 743,600 | 1/1956 | Great Britain | 99—11 |

LIONEL M. SHAPIRO, Primary Examiner

D. M. NAFF, Assistant Examiner

U.S. Cl. X.R.

99—54, 56